(12) United States Patent
Hagari

(10) Patent No.: US 9,389,141 B2
(45) Date of Patent: *Jul. 12, 2016

(54) CYLINDER INTAKE AIR AMOUNT ESTIMATION APPARATUS FOR INTERNAL COMBUSTION ENGINE

(71) Applicant: Mitsubishi Electric Corporation, Chiyoda-ku, Tokyo (JP)

(72) Inventor: Hideki Hagari, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 580 days.

This patent is subject to a terminal disclaimer.

(21) Appl. No.: 13/850,750

(22) Filed: Mar. 26, 2013

(65) Prior Publication Data

US 2014/0067287 A1 Mar. 6, 2014

(30) Foreign Application Priority Data

Sep. 4, 2012 (JP) .................................. 2012-193791

(51) Int. Cl.
*B60T 7/12* (2006.01)
*G01M 15/04* (2006.01)
(Continued)

(52) U.S. Cl.
CPC ........... *G01M 15/04* (2013.01); *F02D 41/0002* (2013.01); *F02D 41/18* (2013.01);
(Continued)

(58) Field of Classification Search
CPC ............ F02D 35/0023; F02D 35/0046; F02D 35/023; F02D 35/025
USPC .......... 701/103; 123/434, 435, 673, 674, 690; 73/114.32, 114.36, 114.37
See application file for complete search history.

(56) References Cited

U.S. PATENT DOCUMENTS

| 6,279,551 B1* | 8/2001 | Iwano ..................... F02B 37/18 |
| | | 123/564 |
| 2005/0066937 A1* | 3/2005 | Toyoshima ........... F02D 11/105 |
| | | 123/339.25 |

(Continued)

FOREIGN PATENT DOCUMENTS

| JP | 05133282 A | 5/1993 |
| JP | 2000-161113 A | 6/2000 |

(Continued)

OTHER PUBLICATIONS

Office Action dated Dec. 3, 2013 in Japanese Patent Application No. 2012-193791.

*Primary Examiner* — John Kwon
(74) *Attorney, Agent, or Firm* — Sughrue Mion, PLLC

(57) ABSTRACT

An estimation device for a cylinder intake air amount in an internal combustion engine can make calculations in real time with a high accuracy in a small number of adaptation constants. The device includes an AFS, a volumetric efficiency corresponding value calculation unit that calculates a volumetric efficiency correction factor which is an index indicating an amount of air entering a cylinder, a physical model that models a response delay of an intake system, and a unit that calculates a cylinder intake air amount actually sucked into the cylinder by using the amount of intake air, the volumetric efficiency correction factor and the physical model. The volumetric efficiency correction factor required for calculating the amount of air sucked into the cylinder by a response delay model of the intake system is calculated by using the intake air amount, an intake manifold density, and an intake manifold density change amount.

9 Claims, 8 Drawing Sheets

(51) Int. Cl.
*F02D 41/18* (2006.01)
*F02D 41/00* (2006.01)
*F02D 41/14* (2006.01)

(52) U.S. Cl.
CPC . *F02D2041/1431* (2013.01); *F02D 2200/0402* (2013.01); *F02D 2200/0411* (2013.01); *Y02T 10/42* (2013.01)

(56) References Cited

U.S. PATENT DOCUMENTS

| | | | | |
|---|---|---|---|---|
| 2007/0293956 | A1* | 12/2007 | Yasui | F01L 13/0021 700/29 |
| 2008/0115762 | A1* | 5/2008 | Hiraku | F02D 13/08 123/339.14 |
| 2011/0126812 | A1* | 6/2011 | Miyashita | F01N 13/107 123/703 |
| 2013/0032101 | A1* | 2/2013 | Takeuchi | F01P 7/164 123/41.02 |
| 2015/0113983 | A1* | 4/2015 | Yokono | F02B 37/18 60/605.1 |
| 2015/0240731 | A1* | 8/2015 | Yokono | F02D 41/0007 60/611 |

FOREIGN PATENT DOCUMENTS

| | | |
|---|---|---|
| JP | 2004-263571 A | 9/2004 |
| JP | 2008138630 A | 6/2008 |
| JP | 2010138787 A | 6/2010 |
| JP | 2010275871 A | 12/2010 |
| JP | 2012154289 A | 8/2012 |

* cited by examiner

CYLINDER INTAKE AIR AMOUNT ESTIMATION APPARATUS FOR INTERNAL COMBUSTION ENGINE

BACKGROUND OF THE INVENTION

1. Field of the Invention

The present invention relates to a control device for an internal combustion engine which is provided with a VVT (variable valve timing) mechanism, and more specifically, to an estimation device for a cylinder intake air amount in an internal combustion engine, which serves for calculating an amount of intake air in a cylinder with a high degree of accuracy.

2. Description of the Related Art

In general, in order to control an engine in a suitable manner, it is important to calculate an amount of air to be sucked into a cylinder with a high degree of accuracy, and to carry out fuel control and ignition timing control according to the amount of air which has been sucked into the cylinder.

With respect to the fuel control, if fuel can be controlled in a feedback manner so that an amount of fuel is injected to provide a target air fuel ratio with respect to the amount of intake air sucked into the cylinder (hereinafter also referred to as a cylinder intake air amount), generally good controllability will be obtained.

On the other hand, with respect to the ignition timing control, there is a need to control ignition timing to an advance angle (MBT: Minimum Advance for Best Torque) so as to provide a maximum output power of the engine according to not only an engine rotational speed and an amount of intake air sucked into a cylinder, but also other factors including, for example, the temperature of the engine, the situation of the occurrence of a knock, the property of fuel, and the rate of EGR (Exhaust Gas Recirculation) which is the ratio of an amount of EGR with respect to the amount of intake air).

Among the above-mentioned factors which have an influence on the MBT, for example, the temperature of the engine can be detected by an engine cooling water temperature sensor, and the situation of the occurrence of a knock can be detected by a knock sensor, and the property of fuel can be determined as regular gasoline or high-octane gasoline according to the situation of the occurrence of a knock.

However, with respect to the rate of EGR, an external EGR can be calculated from the degree of opening of an EGR valve, exhaust gas pressure, and the internal pressure of an intake pipe, but it is difficult to estimate an internal EGR rate with a high degree of accuracy.

That is, with respect to the amount of EGR, there are external EGR control which is based on the degree of opening of the EGR valve arranged in an EGR passage connecting an exhaust pipe and the intake pipe with each other, and internal EGR control which serves to control the amount of exhaust gas remaining in the cylinder. In addition, the external EGR control and the internal EGR control may be carried out at the same time.

The control of the internal EGR is carried out as follows. That is, a VVT (Variable Valve Timing) mechanism is provided which serves to make variable the valve opening and closing timing of an intake valve and an exhaust valve, so that the internal EGR is controlled by changing an overlap period in which the intake valve and the exhaust valve are in their open states at the same time according to the valve opening and closing timing.

In particular, in an engine having an intake and exhaust VVT system which serves to make variable the valve opening and closing timing of an intake valve and an exhaust valve, an amount of air sucked into a cylinder from an intake manifold changes to a large extent depending on the valve opening and closing timing of the intake and exhaust valves, as a result of which in cases where no consideration is given to the influence due to the valve opening and closing timing, the accuracy in the calculation of the amount of air sucked into the cylinder may decrease.

In addition, in recent years, it becomes general to carry out engine control by using engine output torque as an index, and in cases where the engine output torque is estimated, too, thermal efficiency changes according to the cylinder intake air amount and the EGR rate, and hence, in order to calculate the above-mentioned MBT as well as to estimate the torque and the thermal efficiency, too, it is required that the cylinder intake air amount and the EGR rate should be calculated with a high degree of accuracy.

In the past, there has been proposed an estimation device for a cylinder intake air amount in an internal combustion engine in the case where the estimation device is intended to be used for an engine which has an intake and exhaust VVT system (for example, refer to a first patent document and a second patent document to be described later).

In the first patent document, there is disclosed a technique in which a physical model, which models a response delay of an intake system until the air having passed through a throttle valve comes into a cylinder, is used as an arithmetic operation (calculation) model, and the arithmetic operation model is calibrated based on the pressure within an intake air path.

According to the above-mentioned first patent document, it is considered that an error in a volumetric efficiency correction factor can be absorbed, but in the case of the intake and exhaust VVT system, when taking as an example the case where the number of divisions for control in each of the intake air and the exhaust gas is six (in cases where the operating range of a VVT mechanism is represented by six representative points and is interpolated between these adjacent points), data for 6×6 (=36) pieces of volumetric efficiency correction factor maps are required as basic characteristics.

Here, note that six volumetric efficiency correction factor maps are only required for a system configuration having only an intake VVT mechanism.

On the other hand, in the second patent document, there is disclosed a technique in which, unlike the first patent document, by the use of an air flow meter which serves to detect an amount of intake air in an engine, and an intake air pressure sensor which serves to detect a pressure of the intake air in the engine, the amount of intake air thus detected is corrected by an amount of change of the intake air pressure, and the result of the correction operation is integrated in the course of intake stroke, whereby a cylinder intake air amount is calculated for each of cylinders.

According to the above-mentioned second patent document, it appears that the calculation of a volumetric efficiency correction factor and the filtering processing of a response delay model are unnecessary, but with sensors and the like used in engine control, there are many cases in which fine or minute errors may often occur at the time of measurements, and hence, if appropriate countermeasures are taken, it is difficult to calculate the cylinder intake air amount with a high degree of accuracy.

For example, in particular for sensor values of an intake system for which high accuracy is required, processing is carried out for suppressing the fine or minute errors thereof, such as, for example, sampling them every 1 ms and calculating an average value of sampled values between every predetermined crank angles. In addition, it can be said that this has the same effect with respect to the filtering processing of the response delay model.

That is, it is considered that with the technique of the second patent document, a fine or minute error occurs in the cylinder intake air amount, and it is not suitable as it is for fuel control and ignition timing control, and moreover, it is not suitable for use in the estimation arithmetic operation of an engine output torque.

PRIOR ART REFERENCES

Patent Documents

First Patent Document: Japanese patent No. 4029739
Second Patent Document: Japanese patent No. 3622538

SUMMARY OF THE INVENTION

The conventional estimation devices for a cylinder intake air amount in an internal combustion engine have involved the following problems. In the case of the above-mentioned first patent document, an error in a volumetric efficiency correction factor can be absorbed by using an arithmetic operation model, but when applied to an intake and exhaust VVT system, it is not practical because the data for 36 volumetric efficiency correction factor maps are required, for example, and the calculation operation becomes complicated.

In addition, in the case of the above-mentioned second document, a cylinder intake air amount is calculated for each of the cylinders by the use of the air flow meter and the intake air pressure sensor, but there has been a problem that a fine or minute error occurs in the calculated value of a cylinder intake air amount resulting from fine or minute errors involved in the sensors and the like.

Here, it can also be considered that in order to estimate a cylinder intake air amount, for example, a volumetric efficiency corresponding value is calculated based on two internal variables (i.e., an intake efficiency and an exhaust efficiency), by the use of a volumetric efficiency corresponding value (a volumetric efficiency correction factor) which is an index indicating an amount of air coming from an intake manifold into a cylinder, and the above-mentioned response delay modeling. In addition, it can also be considered that an internal EGR rate is estimated based on the exhaust efficiency.

The above-mentioned technique is intended to reduce the number of necessary maps to a substantial extent by calculating internal variables by means of approximate expressions, in contrast to the fact that the intake and exhaust VVT system requires the 36 pieces of volumetric efficiency correction factor maps.

In this case, however, if the internal variables are calculated by linear (first-order) approximate expressions, the number of necessary maps can be reduced to a large extent, but if they are calculated by the use of quadratic (second-order) approximate expressions or cubic (third-order) approximate expressions for the purpose of accuracy improvement, the number of necessary maps will increase, thus giving rise to a problem that the effect of reducing the number of maps will be decreased.

Moreover, in order to obtain approximate expressions for the calculation of the internal variables, in the case of the intake and exhaust VVT system, data measurements for the 36 pieces of volumetric efficiency correction factor maps are eventually required, and hence, there is a problem that any practical effect can not be expected from the point of view of reducing adaptation man hours.

Further, the volumetric efficiency correction factor also has a problem that it is easy to cause errors due to environmental conditions and individual variations, and these errors can not be absorbed.

That is, in an internal combustion engine having a VVT mechanism, in cases where an actual amount of intake air sucked into a cylinder is estimated from a physical model of an intake system using a volumetric efficiency corresponding value, the volumetric efficiency corresponding value changes according to the actual valve timing of the VVT mechanism, so it is necessary to adapt the volumetric efficiency corresponding value according to the valve timing. In addition, when an internal EGR rate is estimated, too, the internal EGR rate changes according to the actual valve timing of the VVT mechanism, so it is necessary to adapt the internal EGR rate according to the valve timing. As a result, there is a problem that the number of maps to be stored becomes huge.

The present invention has been made in order to solve the problems as referred to above, and has for its object to obtain an estimation device for a cylinder intake air amount in an internal combustion engine in which, by calculating in real time a volumetric efficiency correction factor necessary for the estimation of an amount of intake air sucked into a cylinder, adaptation processing of the volumetric efficiency correction factor is made unnecessary, thereby making it possible to achieve calculation processing which does not cause minute errors of sensors or the like as in the second patent document, while achieving a function of absorbing an error of the volumetric efficiency correction factor as in the first patent document, whereby it is possible to calculate the cylinder intake air amount to a sufficient degree of accuracy for controlling the engine in a suitable manner, based on a small number of adaptation constants and a small amount of calculation or computation load, without requiring a huge memory capacity.

According to the present invention, there is provided an estimation device for a cylinder intake air amount in an internal combustion engine, which serves for estimating an amount of intake air sucked into a cylinder in the internal combustion engine which is connected to an intake pipe at a location downstream of a throttle valve, and which is provided with an intake air amount detection unit that detects an amount of intake air which passes through the throttle valve and is sucked into the internal combustion engine, and a physical model that models a response delay of an intake system until the air having passed through the throttle valve comes into the cylinder. The physical model includes: a volumetric efficiency corresponding value calculation unit that calculates a volumetric efficiency corresponding value which is an index indicating an amount of air coming into the cylinder of the internal combustion engine from a downstream side of the throttle valve; a cylinder intake air amount calculation unit that calculates a cylinder intake air amount actually sucked into the cylinder by using the amount of intake air, the volumetric efficiency corresponding value and the physical model; and an intake pipe internal density calculation unit that calculates an intake pipe internal density at the downstream side of the throttle valve, and an amount of change of the intake pipe internal density. The volumetric efficiency corresponding value calculation unit calculates the volumetric efficiency corresponding value by using the amount of intake air, the intake pipe internal density, and the amount of change of the intake pipe internal density.

According to the present invention, by calculating in real time the volumetric efficiency corresponding value used in the physical model which models a response delay of the intake system, it is possible to estimate the cylinder intake air amount to a sufficient degree of accuracy for controlling the engine in a suitable manner, with a small number of adaptation constants and a small amount of calculation load, without requiring a huge memory capacity.

BEST MODE FOR CARRYING OUT THE INVENTION

First Embodiment

Hereinafter, a first embodiment of the present invention will be explained in detail while referring to the accompanying drawings.

Figure 1:
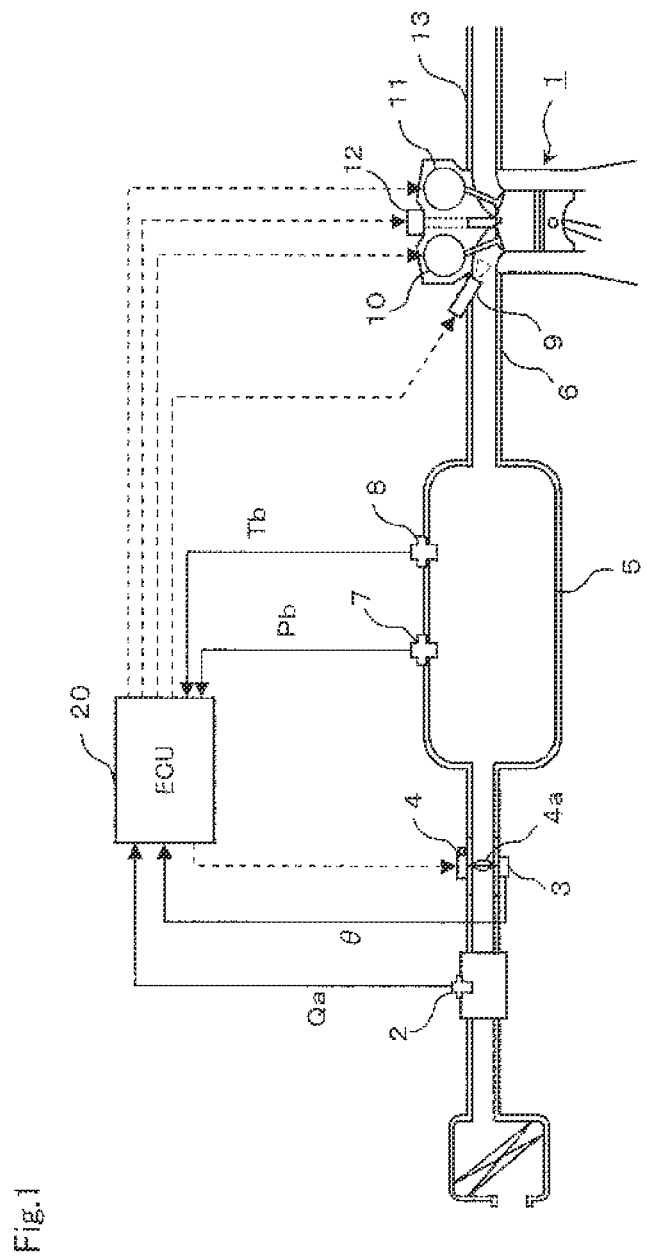
FIG. 1 is a block construction view showing an estimation device for a cylinder intake air amount in an internal combustion engine according to a first embodiment of the present invention, together with an engine.
Figure 2:
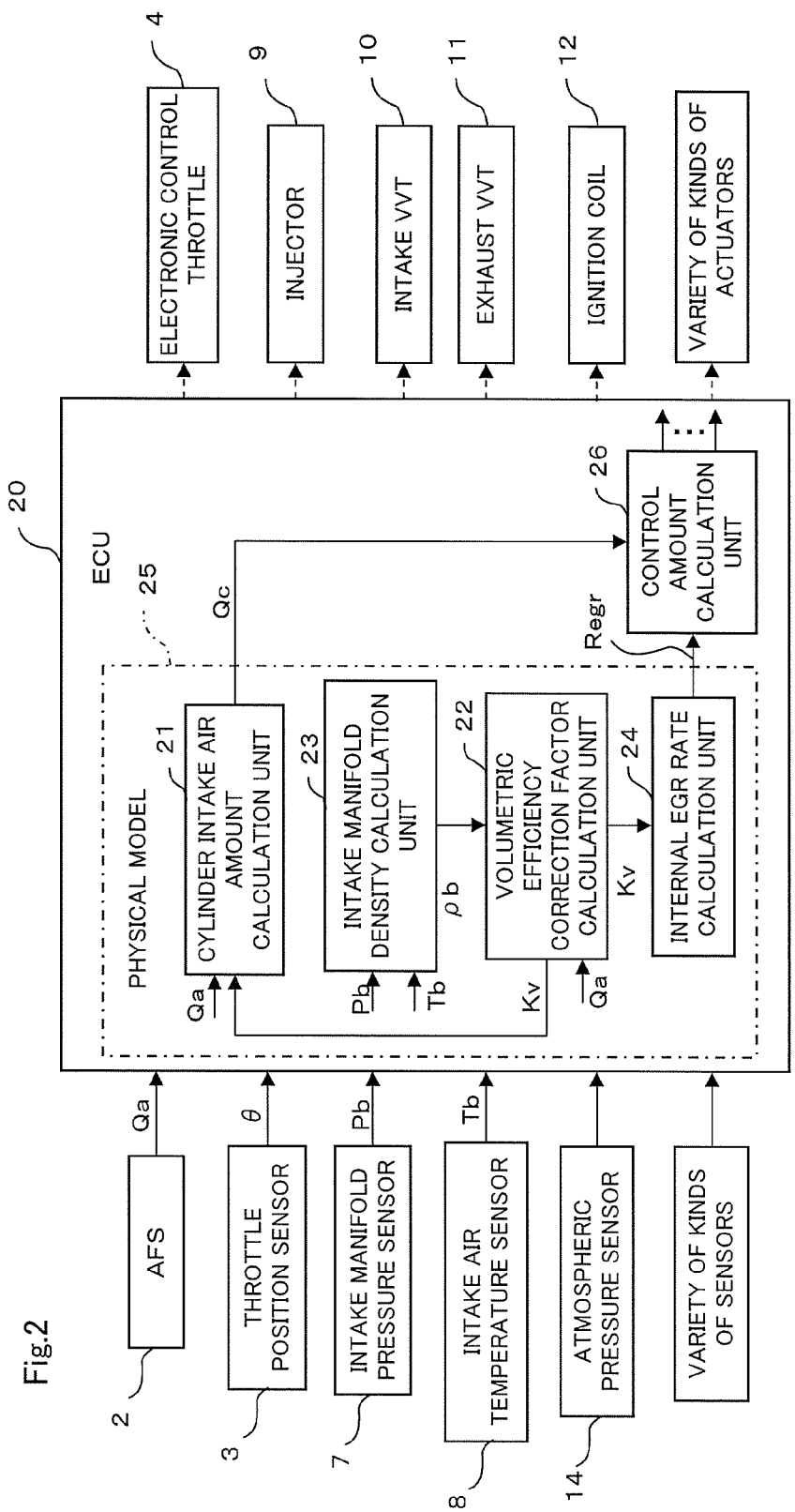
FIG. 2 is a block diagram showing a functional construction of the estimation device for a cylinder intake air amount in an internal combustion engine according to the first embodiment of the present invention, together with a variety of kinds of sensors.

FIG. 1 is a block construction view showing an estimation device for a cylinder intake air amount in an internal combustion engine according to a first embodiment of the present invention, together with an engine 1, and FIG. 2 is a block diagram showing a functional construction of the estimation device for a cylinder intake air amount in an internal combustion engine according to the first embodiment of the present invention, together with a variety of kinds of sensors.

In FIG. 1, the estimation device for a cylinder intake air amount in an internal combustion engine is composed of a variety of kinds of sensors which are related to an engine 1, and an electronic control unit 20 which is connected to the variety of kinds of sensors. Hereinafter, the electronic control unit 20 is simply referred to as the ECU 20 (Electronic Control Unit).

The ECU 20 constitutes an engine control device related to the variety of kinds of sensors and a variety of kinds of actuators, and serves to control the variety of kinds of actuators of the engine 1 based on various pieces of detection information from the variety of kinds of sensors, which indicate the operating states of the engine 1.

At the upstream side of an intake system of the engine 1, there is arranged an air flow sensor 2 that serves to measure an amount of intake air Qa (i.e., an amount of intake air in an intake pipe). Hereinafter, the air flow sensor 2 is simply referred to as an AFS 2 (Air Flow Sensor).

In addition, at the downstream side of the AFS 2 (at the side of the engine 1), there is arranged an electronic control throttle 4.

The electronic control throttle 4 is composed of a throttle valve 4a for regulating the amount of intake air Qa, and a throttle actuator for controlling the degree of opening θ (throttle opening degree) of the throttle valve 4a in an electronical manner. In addition, a throttle position sensor 3 for measuring the degree of opening θ of the electronic control throttle 4 is mounted on the electronic control throttle 4.

At the downstream side of the electronic control throttle 4, there are arranged a surge tank 5 and an intake manifold 6 which serve as an intake pipe (an intake manifold part) for introducing air into the engine 1.

The intake manifold 6, which constitutes a part of the intake pipe, is in communication with a combustion chamber in each of cylinders of the engine 1 through an intake valve.

On the other hand, at the downstream side of the engine 1, there is arranged an exhaust manifold 13 which serves as an exhaust pipe for discharging an exhaust gas which has resulted from the combustion of an air fuel mixture in each cylinder.

The exhaust manifold 13 is in communication with the combustion chamber in each cylinder of the engine 1 through an exhaust valve. In addition, though not illustrated, in the exhaust manifold 13, there are provided an O2 (oxygen) sensor for controlling the air fuel ratio of the mixture, and a catalyst for purifying the exhaust gas.

In the intake pipe at a location downstream of the electronic control throttle 4, there are arranged an intake manifold pressure sensor 7 that serves to measure a pressure (intake manifold pressure Pb) in an intake manifold space including the interiors of the surge tank 5 and the intake manifold 6, and an intake air temperature sensor 8 that serves to measure a temperature (intake manifold temperature Tb) in the intake manifold space.

Here, note that in place of the intake manifold pressure sensor 7 for measuring the intake manifold pressure Pb, there may be provided a unit for estimating the intake manifold pressure, and in place of the intake air temperature sensor 8 for measuring the intake manifold temperature Tb, there may be provided a temperature sensor (e.g., a temperature sensor built in the AFS 2) that serves to measure an ambient air temperature (though strictly different from the intake manifold temperature Tb) in an approximate manner.

In addition, instead of using the AFS 2, there can be used another intake air amount measuring unit such as one for estimating the amount of intake air Qa based on the throttle opening degree θ, for example.

An injector 9 for injecting fuel is arranged in the intake manifold 6 in the vicinity of an intake valve, and an intake VVT 10 and an exhaust VVT 11, which serve to make the valve timing of the intake and exhaust valves variable, are attached to the intake valve and the exhaust valve, respectively.

In addition, an ignition coil 12 for driving a spark plug to generate a spark inside a cylinder is arranged in a cylinder head.

In FIG. 2, the ECU 20 is provided with a physical model 25 of the intake system and a control amount calculation unit 26.

In addition, the physical model 25 is composed of a cylinder intake air amount calculation unit 21, a volumetric efficiency correction factor calculation unit 22, an intake manifold density calculation unit 23, and an internal EGR rate calculation unit 24.

An atmospheric pressure measured by an atmospheric pressure sensor 14 is inputted to the ECU 20, in addition to the variety of kinds of information (the amount of intake air Qa, the throttle opening degree θ, the intake manifold pressure Pb, and the intake manifold temperature Tb) from the above-mentioned individual sensors 2, 3, 7, 8.

In addition, a variety of kinds of measured values from other various kinds of sensors (an accelerator opening sensor, a crank angle sensor, and so on), which are not illustrated, are also inputted to the ECU 20.

Here, note that in place of the atmospheric pressure sensor 14 for measuring an atmospheric pressure, another atmospheric pressure estimating unit may be used, or an atmospheric pressure sensor built in the ECU 20 may be used.

Moreover, although details will be described later, in the physical model 25 of the ECU 20, the intake manifold density calculation unit 23 calculates an intake manifold density ρ b (i.e., a density of fresh air in the intake manifold) based on the intake manifold pressure Pb measured by the intake manifold pressure sensor 7, and the intake manifold temperature Tb measured by the intake air temperature sensor 8.

In addition, the volumetric efficiency correction factor calculation unit 22 calculates a volumetric efficiency correction factor Kv by the use of the intake manifold density ρ b, and the internal EGR rate calculation unit 24 calculates an internal EGR rate Regr by the use of the volumetric efficiency correction factor Kv.

Further, the cylinder intake air amount calculation unit 21 calculates an actual cylinder intake air amount Qc in the engine 1 by the use of the amount of intake air Qa measured by the AFS 2, and the volumetric efficiency correction factor Kv.

The control amount calculation unit 26 in the ECU 20 drives the injector 9 and the ignition coil 12 based on the cylinder intake air amount Qc and the internal EGR rate Regr thus calculated.

In addition, the control amount calculation unit 26 calculates a target torque based on the variety of kinds of information (accelerator opening, etc.), and also calculates a target cylinder intake air amount for achieving the target torque thus calculated. The ECU 20 further calculates, as control target values for achieving the target cylinder intake air amount, a target throttle opening, a target intake VVT phase angle, and a target exhaust VVT phase angle, and controls the degree of opening of the electronic control throttle 4 and the phase angles of the intake VVT 10 and the exhaust VVT 11, so that the individual control target values can be achieved.

Further, the control amount calculation unit 26 controls other various kinds of actuators (an unillustrated EGR valve, etc.), as needed.

Next, reference will be made in detail to the calculation processing of the cylinder intake air amount calculation unit 21 in the physical model 25 (a calculation procedure for the actual cylinder intake air amount Qc based on the amount of intake air Qa measured by the AFS 2), while referring to FIG. 1 and FIG. 2.

First of all, an intake pipe volume Vs [cm³] extending from a downstream end of the electronic control throttle 4 to each cylinder inlet port of the engine 1 and a cylinder stroke volume Vc [cm³] per 1 cylinder are defined.

In addition, with respect to the number of strokes n of the engine 1, there are defined an average value Qa(n) of the amount of intake air Qa [g/s] measured by the AFS 2 for one stroke of the engine 1, an average value Qc(n) of the cylinder intake air amount Qc [g/s] for one stroke, a period of time T(n) [s] for one stroke (i.e., 180 deg. CA in a 4-cylinder engine, and 240 deg. CA in a 3-cylinder engine), an average value ρ b(n) of the intake manifold density ρ b [g/cm³] for one stroke, and a volumetric efficiency correction factor Kv(n) of the air which comes into a cylinder from the intake manifold, respectively.

Here, when the relation between a difference of the actual amount of intake air Qa(n)T(n) and the actual cylinder intake air amount Qc(n)T(n), and an amount of change of the intake manifold density ρ b(n) (average value) is represented by focusing attention only on fresh air (the air which comes into the intake manifold by way of the electronic control throttle 4) in a region indicated by the intake pipe volume Vs, the following expression (1) will be satisfied by applying the law of conservation of mass for one stroke.

[Expression 1]

$$Qa(n)T(n) - Qc(n)T(n) = \{\rho_b(n) - \rho_b(n-1)\} \cdot Vs \quad (1)$$

However, in the expression (1), ρ b(n−1) is an intake manifold density in one stroke before stroke n, and ρ b(n)−ρb(n−1) corresponds to an amount of change Δ ρ b of the intake manifold density.

On the other hand, the actual cylinder intake air amount Qc(n)T(n) for one stroke is represented by the following expression (2), by using the intake manifold density ρ b(n), the cylinder stroke volume Vc and the volumetric efficiency correction factor Kv(n).

[Expression 2]

$$Qc(n)T(n) = Kv(n) \cdot \rho_b(n) \cdot Vc \quad (2)$$

Here, note that when the engine 1 is in a steady state operation, the actual amount of intake air Qa(n)T(n) and the actual cylinder intake air amount Qc(n)T(n) become equal to each other, so it is possible to calculate the volumetric efficiency correction factor Kv by the use of an expression in which the left hand side of the expression (2) is replaced with the actual amount of intake air Qa(n)T(n) at the time of adaptation of engine control constants.

Subsequently, by assigning the expression (2) to the expression (1), the intake manifold density ρ b(n) is eliminated, and solving the expression (1) for the actual cylinder intake air amount Qc(n)T(n), the actual cylinder intake air amount Qc(n)T(n) is represented by the use of a filter constant K, as shown in the following expression (3).

[Expression 3]

$$Qc(n)T(n) = \frac{Kv(n)}{Kv(n-1)} \cdot K \cdot Qc(n-1)T(n-1) + (1-K) \cdot Qa(n)T(n) \quad (3)$$

$$\therefore K = \frac{Vs}{Vs + Kv(n) \cdot Vc}$$

According to the expression (3), it is possible to calculate the actual cylinder intake air amount Qc(n)T(n) from the actual amount of intake air Qa(n)T(n) measured by the AFS 2 with a high degree of accuracy. In addition, from the actual cylinder intake air amount Qc(n)T(n), a charging efficiency in the cylinder can be calculated with a high degree of accuracy, so that it can be used for various kinds of engine control.

By further transforming the expression (3), the following expressions (4) will be obtained.

[Expression 4]

$$\frac{Qc(n)T(n)}{Kv(n)} = K \cdot \frac{Qc(n-1)T(n-1)}{Kv(n-1)} + (1-K) \cdot \frac{Qa(n)T(n)}{Kv(n)} \quad (4)$$

The expression (4) means a digital low pass filter in interrupt processing which is in synchronization with the rotation of the engine 1 (e.g., every prescribed crank angle). Accordingly, it will be understood that the intake system of the engine 1 is a first order lag element.

Now, reference will be made in detail to a calculation operation procedure for achieving the above-mentioned expression (3) inside the ECU 20, while referring to a flow chart of FIG. 3.

Figure 3:
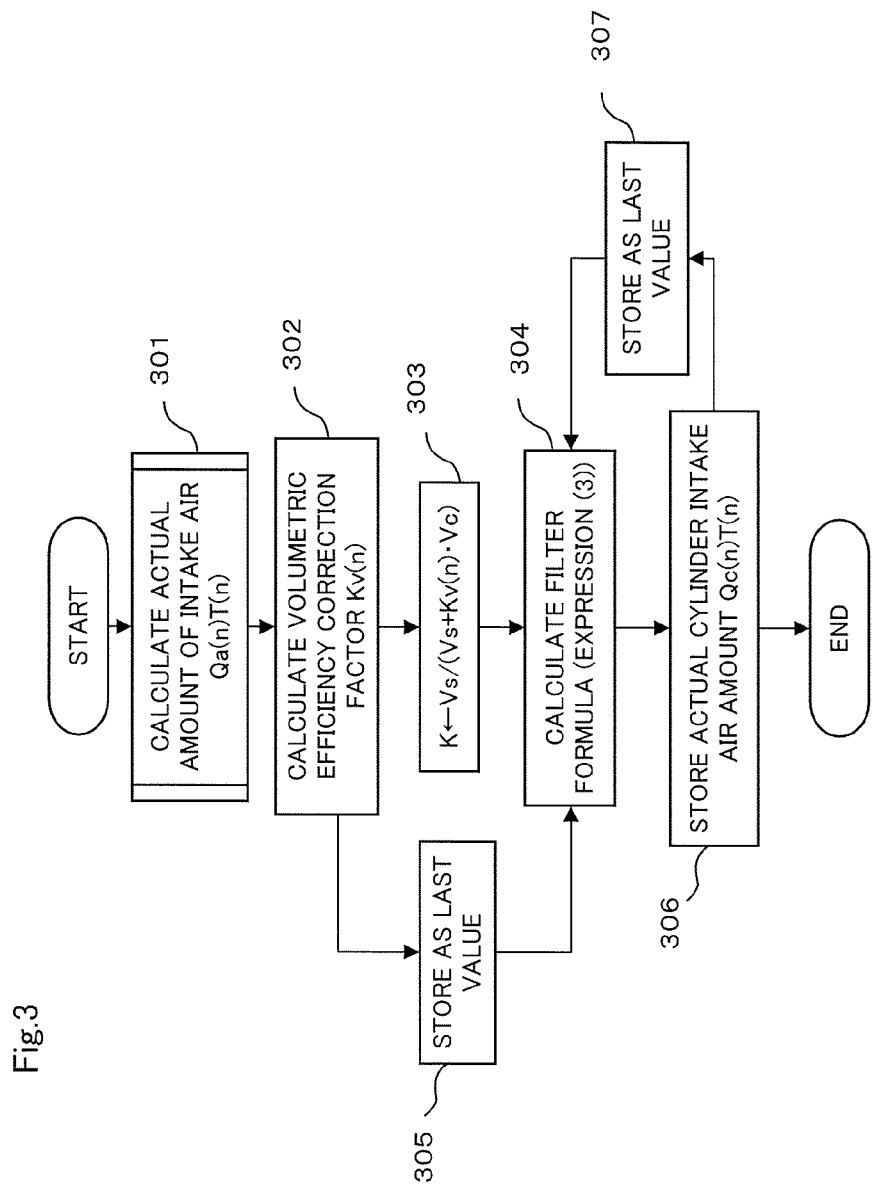
FIG. 3 is a flow chart showing a calculation procedure for an amount of intake air in a cylinder according to the first embodiment of the present invention.

FIG. 3 shows a processing procedure of the cylinder intake air amount calculation unit 21 and the volumetric efficiency correction factor calculation unit 22, wherein the procedure is carried out by interrupt processing (B05 processing) at each predetermined crank angle (e.g., BTDC 05 [degCA]).

In FIG. 3, first, the cylinder intake air amount calculation unit 21 calculates the actual amount of intake air Qa(n)T(n) [g] for one stroke based on a crank angle signal from the crank angle sensor and a measured value of the amount of intake air Qa (step 301).

Specifically, in cases where the AFS 2 is a mass flow meter, the output voltage (measured value) of the AFS 2 is integrated, while sampling at each predetermined period of time (e.g., 1.25 ms), so that the actual amount of intake air Qa(n)T(n) [g] for one stroke can be achieved or calculated based on the value integrated from the last interrupt processing until the current interrupt processing.

Here, note that in cases where the AFS 2 is a volume flow meter, the actual amount of intake air Qa(n)T(n) [g] for one stroke can be calculated by converting the volume of intake air into a corresponding mass based on a standard atmosphere density, an atmospheric pressure, and an intake air temperature (the intake manifold temperature Tb).

Then, the volumetric efficiency correction factor calculation unit 22 calculates the volumetric efficiency correction factor Kv(n) (step 302). Here, note that the details of the calculation processing in step 302 will be described later in FIG. 4.

The calculated value in step 302 is stored as the last value (step 305), and is used as a volumetric efficiency correction factor Kv(n−1) before one stroke, in calculation processing of step 304 to be described later.

Subsequently, the cylinder intake air amount calculation unit 21 calculates the filter constant K in the expression (3) (step 303), and at the same time, calculates the actual cylinder intake air amount Qc(n)T(n) [g] according to a filter calculation expression in the expression (3) (step 304).

At this time, the volumetric efficiency correction factor Kv(n−1) before one stroke stored in step 305 is used as the volumetric efficiency correction factor Kv(n−1) before one stroke.

Finally, the actual cylinder intake air amount Qc(n)T(n) [g] calculated in step 304 is stored (step 306), and the processing routine of FIG. 3 is ended.

Here, note that the calculated value in step 306 is stored as the last value (step 307), and is used as an actual cylinder intake air amount Qc(n−1)T(n−1) [g] before one stroke, in calculation processing of the next step 304.

As described above, the actual cylinder intake air amount Qc(n)T(n) [g] can be calculated with a high degree of accuracy by means of a simple calculation operation using the volumetric efficiency correction factor Kv(n).

Next, the calculation processing (step 302) by the volumetric efficiency correction factor calculation unit 22 will be explained in detail.

The expression (3) obtained from the expression (1) and the expression (2) is one for calculating the actual cylinder intake air amount Qc(n)T(n) from the actual amount of intake air Qa(n)T(n) measured by the AFS 2.

Here, when the actual cylinder intake air amount Qc(n)T(n) is eliminated by assigning the expression (2) for the expression (1), the volumetric efficiency correction factor Kv(n) is represented by the following expression (5) using the actual amount of intake air Qa(n)T(n) (the amount of intake air Qa), the amount of change A p b of the intake manifold density, the intake pipe volume Vs, the intake manifold density ρ b(n), and the cylinder stroke volume Vc.

[Expression 5]

$$Kv(n) = \frac{Qa(n)T(n) - \{\rho_b(n) - \rho_b(n-1)\} \cdot Vs}{\rho_b(n) \cdot Vc} \quad (5)$$

The intake manifold density ρ b(n) [g/cm³] in the expression (5) can be calculated by means of an equation of state comprising the following equation (6), using the intake manifold pressure Pb(n) [kPa] measured by the intake manifold pressure sensor 7, the intake manifold temperature Tb(n) [° K] measured by the intake air temperature sensor 8, and a gas constant R [kJ/(kg·K)]

[Expression 6]

$$\rho_b(n) = \frac{p_b(n)}{RT_b(n)} \quad (6)$$

In this manner, it is possible to calculate the volumetric efficiency correction factor Kv(n) in real time based on the individual output values of the AFS 2, the intake manifold pressure sensor 7, and the intake air temperature sensor 8, by the use of the expression (5).

However, minute measurement noise may be frequently contained in the above-mentioned sensor output values, and hence, errors may occur even if the actual cylinder intake air amount Qc(n)T(n) is calculated from the expression (3) by the use of the volumetric efficiency correction factor Kv(n) calculated by the expression (5).

In order to avoid the errors resulting from the above-mentioned noise, it is effective to attenuate a noise component by carrying out filtering processing with respect to the volumetric efficiency correction factor Kv(n) calculated by the expression (5), and then to calculate the expression (3) by the use of the volumetric efficiency correction factor Kvf(n) after the attenuation of the noise component (after filtering).

Specifically, the filtered volumetric efficiency correction factor Kvf(n) can be calculated by means of the filtering processing using a filter constant K1 (e.g., a value of about 0.9-0.99), as shown in the following expression (7).

[Expression 7]

$$Kvf(n) = K_1 \cdot Kvf(n-1) + (1-K_1) \cdot Kv(n) \quad (7)$$

Here, note that although in the expression (7), first-order low pass filtering processing has been applied in order to attenuate the noise component, the invention is not limited to this, but a value may be used which is obtained by carrying out simple moving average processing with respect to the values for the past several strokes, or a value may be used which is obtained by carrying out weighted moving average processing (i.e., processing to calculate an average value of individual data for the past several strokes by giving different weights to the date) or the like.

From the above-mentioned point of view, the filtered volumetric efficiency correction factor Kvf(n) is to be used as the volumetric efficiency correction factor Kv(n) in the expression (3).

Next, reference will be made in detail to calculation processing (calculation operation using the expression (5) through the expression (7)) which is carried out by the physical model 25 (the intake manifold density calculation unit 23, the cylinder intake air amount calculation unit 21, and the volumetric efficiency correction factor calculation unit 22), while referring to a flow chart of FIG. 4.

Figure 4:
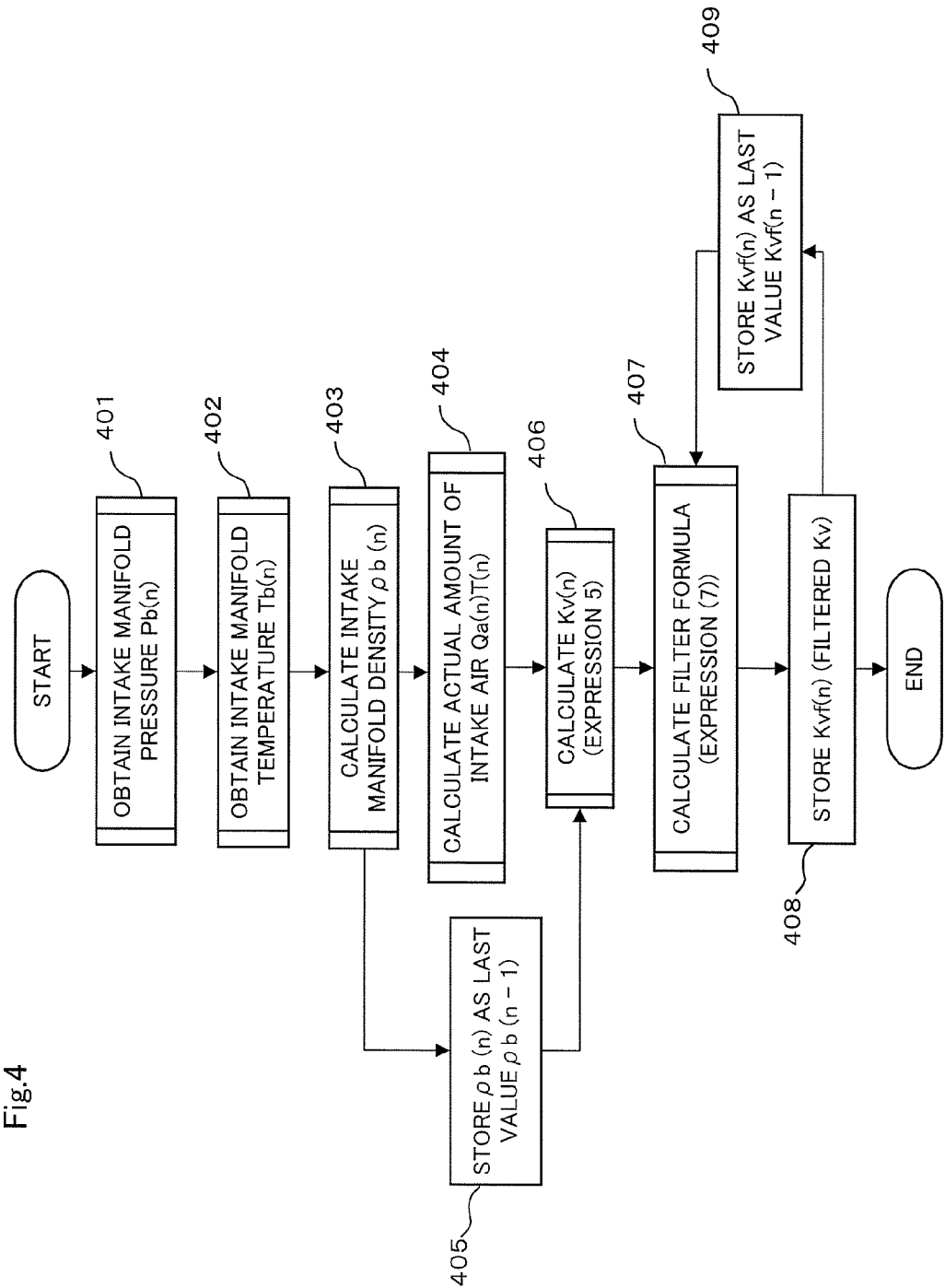
FIG. 4 is a flow chart showing a calculation procedure for a volumetric efficiency correction factor according to the first embodiment of the present invention.

The calculation processing or routine of FIG. 4 is carried out by interrupt processing (e.g., B05 processing) at each predetermined crank angle (e.g., BTDC 05 [degCA]).

In FIG. 4, first, the intake manifold density calculation unit 23 obtains the intake manifold pressure Pb(n) from the intake manifold pressure sensor 7 (step 401).

Here, note that the intake manifold pressure Pb(n) often vibrates in synchronization with the opening and closing of the intake VVT 10 and the exhaust VVT 11, and hence, it is desirable to calculate the intake manifold pressure Pb(n) by means of statistical processing, as in the case of the calculation processing of the above-mentioned actual amount of intake air Qa(n)T(n) [g] for one stroke (step 301).

Specifically, it is possible to calculate the intake manifold pressure Pb(n) for one stroke as an average value in which variations have been absorbed, by integrating the output voltage of the intake manifold pressure sensor 7, while sampling it every 1.25 ms, and dividing an integrated value of the output voltage from the last interrupt processing until the current interrupt processing by the number of times or frequency of integration.

Then, the intake manifold density calculation unit 23 obtains the intake manifold temperature Tb(n) from the intake air temperature sensor 8 (step 402).

With respect to the intake manifold temperature Tb(n), too, an average value for one stroke may be used, similar to the intake manifold pressure Pb(n), but in general, the response of a temperature sensor is bad in comparison with that of a pressure sensor, so there will be no inconvenience even if an instantaneous temperature value is used.

Subsequently, the intake manifold density ρ b(n) is calculated by using the above-mentioned expression (6) (step 403).

The calculated value in step 403 is stored as the last value (step 405), and is used as an intake manifold density ρ b(n−1) before one stroke, in calculation processing of step 406 to be described later.

Subsequently, although the cylinder intake air amount calculation unit 21 calculates the actual amount of intake air Qa(n)T(n) [g] for one stroke (step 404), as this value, the actual amount of intake air Qa(n)T(n) [g] calculated at step 301 in FIG. 3 can be used for it as it is.

Thereafter, the volumetric efficiency correction factor calculation unit 22 calculates the volumetric efficiency correction factor Kv(n) from the expression (5) by using the intake manifold density ρ b(n) calculated in step 403, the actual amount of intake air Qa(n)T(n) [g] for one stroke calculated in step 404, and the last intake manifold density ρ b(n−1) stored in step 405 (step 406).

Finally, the volumetric efficiency correction factor calculation unit 22 carries out filtering processing for attenuating the noise component which is superimposed on the volumetric efficiency correction factor Kv(n) by the use of the above-mentioned expression (7) (step 407), and stores the filtered volumetric efficiency correction factor Kvf(n) (step 408), after which the processing routine of FIG. 4 is ended.

Here, note that in the filtering processing of the expression (7) (step 407), it is necessary to use the last filtered volumetric efficiency correction factor Kvf(n−1), and so the volumetric efficiency correction factor Kvf(n), which is the result of the filtering processing in step 408, is stored as the last value (step 409).

As a result of this, in the next filter calculation (step 407), the last value stored in step 409 can be used as the volumetric efficiency correction factor Kvf(n−1) before one stroke.

As described above, the volumetric efficiency correction factor Kv(n) and the filtered volumetric efficiency correction factor Kvf(n) can be calculated with a high degree of accuracy by means of the simple calculation processing using the individual output values of the AFS 2, the intake manifold pressure sensor 7 and the intake air temperature sensor 8.

Next, the calculation processing by the internal EGR rate calculation unit 24 in the physical model 25 will be explained in detail.

First, as a technical background, in order to represent the relation between the volumetric efficiency correction factor Kv and the internal EGR rate Regr, the following expression (8) is derived by using an intake efficiency Kin, an exhaust efficiency Kex, and a compression ratio E of an air fuel mixture sucked into a cylinder.

[Expression 8]

$$Kv = K_{in} \cdot \left( \frac{\varepsilon}{\varepsilon - 1} - K_{ex} \cdot \frac{1}{\varepsilon - 1} \right), \quad (8)$$

$$R_{egr} = \frac{K_{ex}}{\varepsilon}$$

In addition, the intake efficiency Kin and the exhaust efficiency Kex are defined, as shown in the following expression (9), by using the intake manifold pressure Pb, the intake manifold temperature Tb, a cylinder internal pressure Pin [kPa] and a cylinder internal temperature Tin [° K] at the time of the end of the intake stroke (at B180), an exhaust manifold pressure Pex [kPa] (an internal pressure in the exhaust manifold 13) and an exhaust temperature Tex [° K] (a temperature in the exhaust pipe) at the time of the end of the exhaust stroke, an assumed residual gas volume Vex [L] (a volume which is occupied by a residual gas at the exhaust manifold pressure Pex and at the exhaust temperature Tex), and a clearance volume Vmin [L].

[Expression 9]

$$K_{in} = \frac{p_{in}}{p_b} \cdot \frac{T_b}{T_{in}}, \quad (9)$$

$$K_{ex} = \frac{V_{ex}}{V_{min}} \cdot \frac{p_{ex}}{p_{in}} \cdot \frac{T_{in}}{T_{ex}}$$

Hereinafter, a new approach, which is different from the expression (8) and the expression (9), will be tired to derive a relational expression of the volumetric efficiency correction factor Kv and the internal EGR rate Regr, while referring to FIG. 5.

Figure 5:
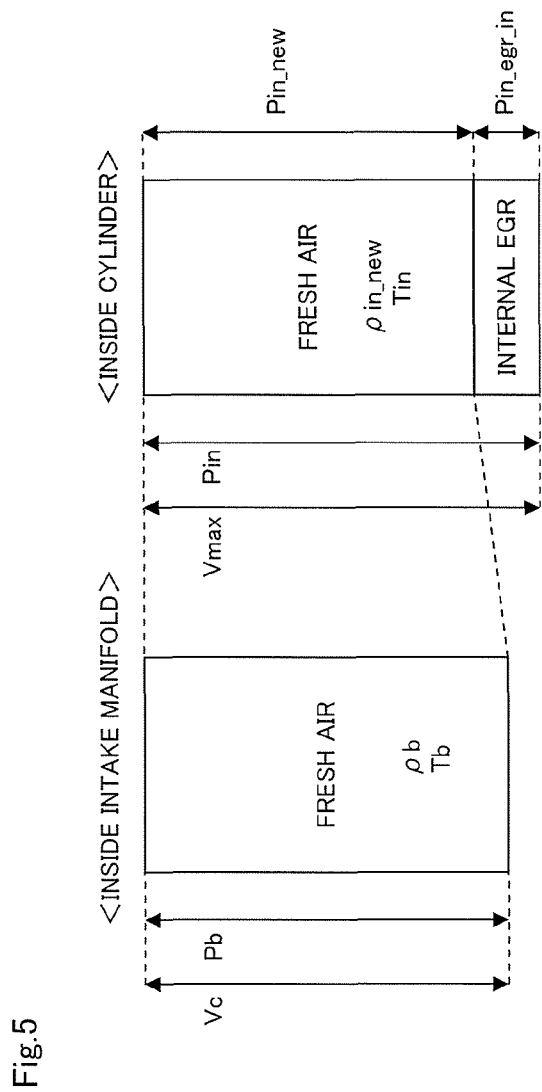
FIG. 5 is an explanatory view showing the relations between the individual volumes and individual pressures of fresh air and internal EGR in an intake manifold and in a cylinder in the first embodiment of the present invention.

FIG. 5 is an explanatory view showing the relations between the individual volumes and the individual pressures of fresh air and internal EGR, wherein the individual relations inside the intake manifold and the cylinder are shown.

In FIG. 5, there are shown the cylinder stroke volume Vc [cm³], a maximum volume Vmax [cm³], an intake manifold density ρ b [g/cm³], an in-cylinder fresh air partial density rhoin_new [g/cm³], an in-cylinder fresh air partial pressure Pin_new [kPa] at the time of the end of the intake stroke, and a cylinder internal EGR partial pressure Pin_egr_in [kPa] at the time of the end of the intake stroke.

The volumetric efficiency correction factor Kv is an index which indicates the ratio of an amount of air which occupies the stroke volume Vc of a cylinder in the intake manifold, and an amount of fresh air which has actually entered the cylinder, and hence, it can be defined, as shown in the following expression (10).

[Expression 10]

$$Kv = \frac{Q_C(n)T(n)}{\rho_b(n)V_c} = \frac{\rho_{in\_new} \cdot V_{max}}{\rho_b \cdot V_c} \quad (10)$$

By transforming the expression (10) with the use of the above-mentioned expression (6) (the equation of state), the following expression (11) will be obtained.

[Expression 11]

$$Kv = \frac{\frac{P_{in\_new}}{T_{in}}}{\frac{P_b}{T_b}} \cdot \frac{V_{max}}{V_c} = \frac{P_{in\_new}}{P_b} \cdot \frac{T_b}{T_{in}} \cdot \frac{V_{max}}{V_c}$$

$$= \left(\frac{P_{in}}{P_b} \cdot \frac{T_b}{T_{in}}\right) \cdot \frac{V_{max}}{V_c} \cdot \frac{P_{in\_new}}{P_{in}} \quad (11)$$

In addition, because the in-cylinder fresh air partial pressure Pin_new at the time of the end of the intake stroke is a value which is obtained by subtracting the in-cylinder internal EGR partial pressure Pin_egr_in at the time of the end of the intake stroke from the cylinder internal pressure Pin at the time of the end of the intake stroke, the volumetric efficiency correction factor Kv is represented as shown in the following expression (12).

[Expression 12]

$$Kv = \left(\frac{P_{in}}{P_b} \cdot \frac{T_b}{T_{in}}\right) \cdot \frac{V_{max}}{V_c} \cdot \frac{P_{in} - P_{in\_egr\_in}}{P_{in}}$$

$$= \left(\frac{P_{in}}{P_b} \cdot \frac{T_b}{T_{in}}\right) \cdot \frac{V_{max}}{V_c} \cdot \left(1 - \frac{P_{in\_egr\_in}}{P_{in}}\right) \quad (12)$$

Further, when a relational expression of the cylinder internal volume (the ratio of the maximum volume Vmax and the cylinder stroke volume Vc) and a definitional equation of the internal EGR rate Regr are represented on the assumption that the intake efficiency Kin is defined as the same as the expression (9), the following expression (13) will be obtained.

[Expression 13]

$$\frac{V_{max}}{V_c} = \frac{\varepsilon}{\varepsilon - 1},$$

$$R_{egr} = \frac{P_{in\_egr\_in}}{P_{in}} \quad (13)$$

Moreover, the above-mentioned expression (12) indicating the volumetric efficiency correction factor Kv is represented as shown in the following expression (14).

[Expression 14]

$$Kv = K_{in} \cdot \frac{\varepsilon}{\varepsilon - 1} \cdot (1 - R_{egr})$$

$$= K_{in} \cdot \left(\frac{\varepsilon}{\varepsilon - 1} - K_{ex} \cdot \frac{1}{\varepsilon - 1}\right) \quad (14)$$

$$\therefore R_{egr} = \frac{K_{ex}}{\varepsilon}$$

It will be understood that the expression (14) is the same as the above-mentioned expression (8).

Here, the exhaust efficiency Kex is represented by the following expression (15) with the use of the compression ratio E of the air fuel mixture, the internal EGR rate Regr, the assumed residual gas volume Vegr [L] (the volume which is occupied by the residual gas at Pin and Tin at the time of the end of the intake stroke) corresponding to the amount of EGR.

[Expression 15]

$$K_{ex} = \varepsilon \cdot R_{egr} = \varepsilon \cdot \frac{P_{in\_egr\_in}}{P_{in}} = \varepsilon \cdot \frac{P_{in} \cdot \frac{V_{egr}}{V_{max}}}{P_{in}}$$

$$= \varepsilon \cdot \frac{V_{egr}}{V_{max}} = \frac{V_{egr}}{V_{min}} = \frac{V_{ex}}{V_{min}} \cdot \frac{P_{ex}}{P_{in}} \cdot \frac{T_{in}}{T_{ex}} \quad (15)$$

$$\therefore \frac{P_{in} V_{egr}}{T_{in}} = \frac{P_{ex} V_{ex}}{T_{ex}}$$

It will be understood that the expression (15) is the same as the above-mentioned expression (9).

As described above, it turns out that in the different approach, too, the relational expression of the volumetric efficiency correction factor Kv and the internal EGR rate Regr can be derived.

The relation between the volumetric efficiency correction factor Kv and the internal EGR rate Regr is shown in the expression (8) or the expression (14), but when solving for the internal EGR rate Regr so as to make it still clearer, the internal EGR rate Regr is represented as shown in the following expression (16).

[Expression 16]

$$R_{egr} = 1 - \frac{Kv}{K_{in} \cdot \frac{\varepsilon}{\varepsilon - 1}} \quad (16)$$

As is clear from the expression (16), the internal EGR rate Regr can be calculated by using the volumetric efficiency correction factor Kv and the intake efficiency Kin.

Here, the filtered volumetric efficiency correction factor Kvf(n) is to be used as the volumetric efficiency correction factor Kv(n) in the expression (16), as in the case of the above-mentioned expression (3).

The intake efficiency Kin is defined as shown in the above-mentioned expression (9).

As is clear from the expression (9), the intake efficiency Kin can be calculated by using, in addition to the intake manifold pressure Pb and the intake manifold temperature Tb, the cylinder internal pressure Pin at the time of the end of the intake stroke and the cylinder internal temperature Tin at the time of the end of the intake stroke which is calculated by the use of the internal EGR rate Regr.

However, these physical quantities are not used in ordinary engine control, so it is necessary to calculate them by estimation using physical quantities for engine control.

First, reference will be made to the calculation processing of the cylinder internal pressure Pin at the time of the end of the intake stroke, while referring to FIG. 6.

Figure 6:
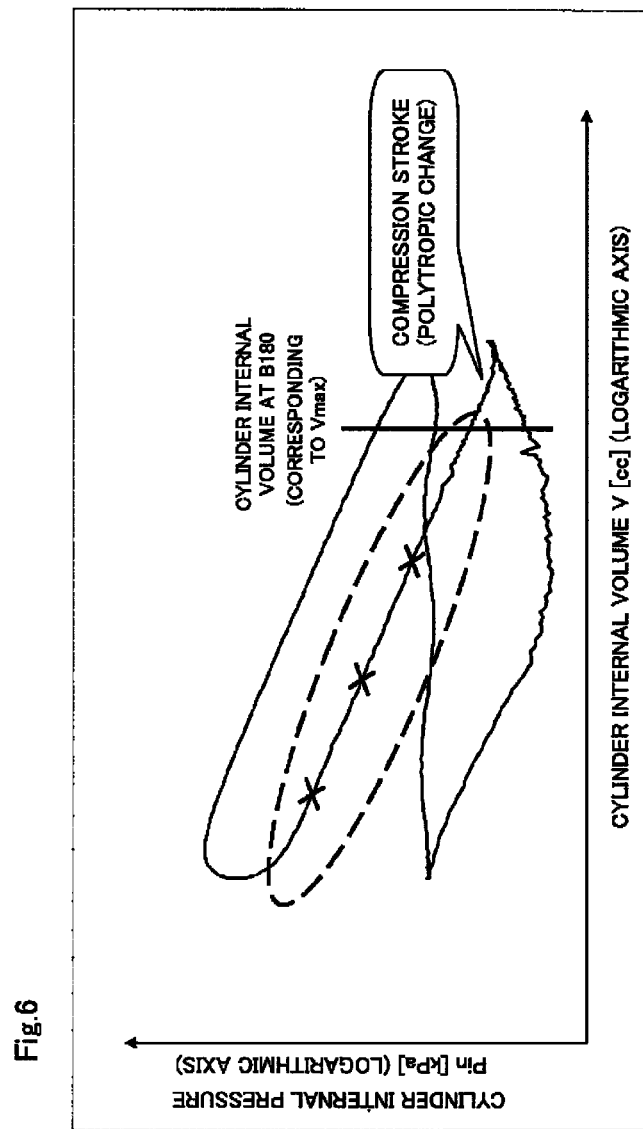
FIG. 6 is an explanatory view showing an example of the relation between an internal pressure in a clyinder and an internal volume thereof (a P-V diagrammatic view in bi-logarithmic representation) according to the first embodiment of the present invention.

FIG. 6 is an explanatory view showing an example of the relation between an internal pressure in a cylinder measured by a cylinder internal pressure sensor (not shown) and a cylinder internal volume (a P-V diagrammatic view in bi-logarithmic representation).

In FIG. 6, an axis of abscissa represents the cylinder internal volume V [cc] (logarithmic axis), and an axis of ordinate represents the cylinder internal pressure Pin [kPa] (logarithmic axis), wherein a region surrounded by a broken line represents the compression stroke.

Here, the change of state in the compression stroke without accompanying combustion is known as a polytropic change, and is in general represented by the following expression.

[Expression 17]

$$PV^n = C (\rightarrow 定)$$

$$\therefore \log P = -n \log V + \log C \qquad (17)$$

Here, note that the polytropic change means that in cases where an air fuel mixture or combustion gas is compressed, a part of heat is actually taken by outside air, cooling water, etc., and hence, the relation between the pressure and the temperature is carried out by an intermediate change between an isothermal change and an adiabatic change.

As is clear from FIG. 6, when the change of state before combustion is considered according to a log-log coordinate system, it is represented by a linear (first-order) function with a slope of −n (n being a polytropic index which is approximately 1.3-1.4), as shown by the broken line region.

Accordingly, in order to calculate the cylinder internal pressure Pin at the time of the end of the intake stroke (B180), it is only necessary to estimate the cylinder internal pressure at a location corresponding to B180 from each of several points before ignition (before combustion) (e.g., locations indicated by x in the broken line region), and to obtain an average value thereof.

Figure 7:
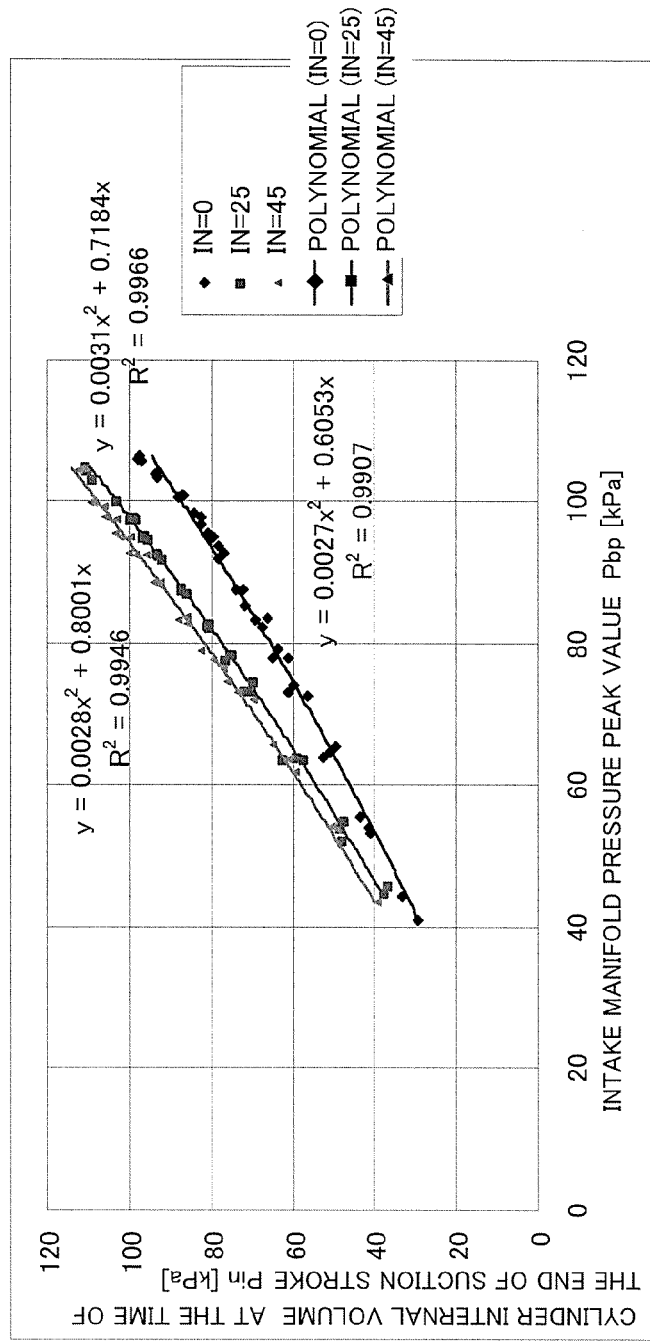
FIG. 7 is an explanatory view showing the relation between an intake manifold pressure peak value and an internal pressure in a cylinder at the time of the end of intake stroke according to the first embodiment of the present invention.

FIG. 7 is an explanatory view showing the relation between the cylinder internal pressure Pin at the time of the end of the intake stroke calculated as mentioned above and the intake manifold pressure.

In FIG. 7, an axis of abscissa represents the intake manifold pressure peak value (the maximum value between prescribed crank angles (e.g., between adjacent B05)) Pbp [kPa], and an axis of abscissa represents the cylinder internal pressure Pin [kPa] at the time of the end of the intake stroke, wherein the characteristics according to differences in numerical values IN (=0, 25, 45) indicating phase angles InVVT of the intake VVT 10 are shown by polynomials (lines) along points of black rhombuses, black rectangles, and black triangles, respectively.

Here, the reason for having used not an intake manifold pressure average value (an average value of the intake manifold pressure in a period of time between prescribed crank angles (e.g., between adjacent B05)) but an intake manifold pressure peak value Pbp is that a better correlation has been obtained by using the intake manifold pressure peak value rather than the intake manifold pressure average value.

Here, note that FIG. 7 is a view in which no consideration is given to the exhaust VVT 11, so an arrangement is carried out only with the intake VVT 10 without regard to the exhaust VVT 11.

As is clear from the characteristics (polynomials) of FIG. 7, it is understood that the cylinder internal pressure Pin at the time of the end of the intake stroke can be approximated by a quadratic (second-order) function of the intake manifold pressure peak value Pbp which passes through an origin point, for each intake VVT 10 without regard to the exhaust VVT 11.

At this time, the cylinder internal pressure Pin at the time of the end of the intake stroke is represented as shown by the following expression (18).

[Expression 18]

$$P_{in} = A \cdot P_{bp}^2 + B \cdot P_{bp} \qquad (18)$$

The reason for which the cylinder internal pressure Pin at the time of the end of the intake stroke can be calculated in the form such as the expression (18) is that it can be said that the cylinder internal pressure Pin is an index indicating how much pressure a gas can be pushed into the cylinder, when the intake manifold pressure peak value Pbp is a predetermined value.

That is, it is considered that the cylinder internal pressure Pin is represented by the phase angle of the intake VVT 10 in connection with the intake valve and an open period of time of the intake valve (cc the engine rotational speed), without regard to an overlap amount in connection with the exhaust valve and the phase angle of the exhaust VVT 11. In addition, it is also considered that the cylinder internal pressure Pin does not influence the exhaust pressure (=atmospheric pressure), either.

On the other hand, the cylinder internal temperature Tin can be calculated, as shown in the following expression (19), by the use of the intake manifold temperature Tb, the exhaust temperature Tex, and the internal EGR rate Regr.

[Expression 19]

$$T_{in} = (1 - R_{egr}) \cdot T_b + R_{egr} \cdot T_{ex} = T_b + R_{egr} \cdot (T_{ex} - T_b) \qquad (19)$$

Here, for the exhaust temperature Tex, it may be set through a map based on measured values (e.g., by the use of a map of the engine rotational speed and the intake manifold pressure or the charging efficiency), or it may be calculated from an index such as a thermal efficiency, which is separately calculated for engine control, or still more simply, it may also be set as a fixed value (e.g., about 800 degrees C.).

In addition, it is necessary to calculate the internal EGR rate Regr, too, but the expression (19) for calculating the cylinder internal temperature Tin at the time of the end of the intake stroke contains the internal EGR rate Regr, and the expression (9) for calculating the intake efficiency Kin also contains the internal EGR rate Regr, as a result of which even if the intake efficiency Kin and the cylinder internal temperature Tin are to be calculated for the purpose of calculation of the internal EGR rate Regr, these expressions can not be solved as they are.

Accordingly, in order to eliminate the cylinder internal temperature Tin and the internal EGR rate Regr at the time of the end of the intake stroke from the expression (9) which calculates the intake efficiency Kin, when the expression (19) is first assigned for the expression (9) and the expression (16) is further assigned therefor, the intake efficiency Kin is represented as shown in the following expression (20).

[Expression 20]

$$K_{in} = \frac{P_{in}}{P_b} \cdot \frac{T_b}{T_{in}} = \frac{P_{in}}{P_b} \cdot \frac{T_b}{T_b + R_{egr} \cdot (T_{ex} - T_b)} \quad (20)$$

$$= \frac{P_{in}}{P_b} \cdot \frac{T_b}{T_b + \left(1 - \frac{Kv}{K_{in} \cdot \varepsilon/(\varepsilon - 1)}\right) \cdot (T_{ex} - T_b)}$$

$$= \frac{P_{in}}{P_b} \cdot \frac{T_b}{T_{ex} - \frac{Kv}{K_{in} \cdot \varepsilon/(\varepsilon - 1)} \cdot (T_{ex} - T_b)}$$

When the expression (20) is solved for the intake efficiency Kin, the following expression (21) results.

[Expression 21]

$$K_{in} \cdot T_{ex} - \frac{Kv}{\varepsilon/(\varepsilon - 1)} \cdot (T_{ex} - T_b) = \frac{P_{in}}{P_b} \cdot T_b \quad (21)$$

$$\therefore K_{in} = \frac{\frac{P_{in}}{P_b} \cdot T_b + \frac{Kv}{\varepsilon/(\varepsilon - 1)} \cdot (T_{ex} - T_b)}{T_{ex}}$$

The intake efficiency Kin can be calculated by the use of the expression (21), without using the cylinder internal temperature Tin and the internal EGR rate Regr at the time of the end of the intake stroke.

Here, the filtered volumetric efficiency correction factor Kvf(n) is to be used as the volumetric efficiency correction factor Kv(n) in the expression (21), as in the case of the above-mentioned expressions (3) and (16).

Next, the calculation processing by the internal EGR rate calculation unit 24 will be explained in further detail, while referring to a flow chart of FIG. 8.

Figure 8:
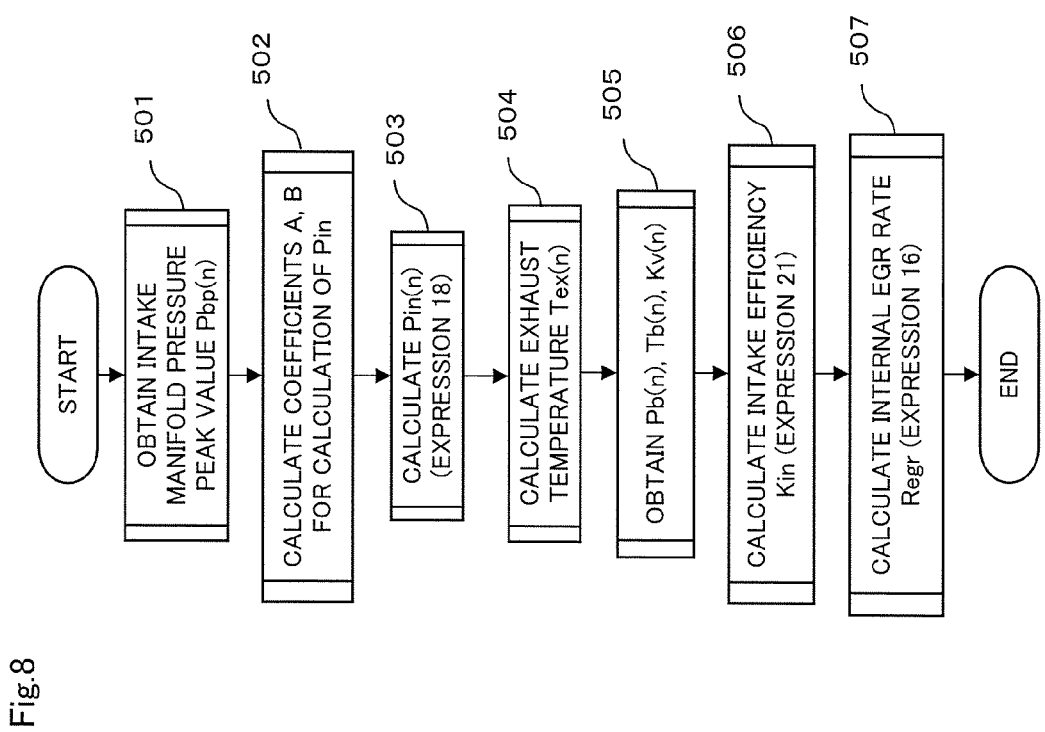
FIG. 8 is a flow chart showing a calculation procedure for an internal EGR rate according to the first embodiment of the present invention.

FIG. 8 is the flow chart showing a calculation procedure for the internal EGR rate Regr according to the first embodiment of the present invention, wherein calculation processing (steps 503, 506 and 507) using the expression (18), the expression (21) and the expression (16), and its related processing (steps 501, 502 and 505) are shown.

The calculation processing or routine of FIG. 8 is carried out by interrupt processing at each predetermined crank angle (e.g., BTDC 05 [degCA]).

In FIG. 8, first, the internal EGR rate calculation unit 24 calculates a peak value of the intake manifold pressure Pbp(n) [KPa] for one stroke (step 501).

Here, note that in order to calculate the intake manifold pressure peak value Pbp(n) for one stroke, it is only necessary to obtain a peak value of the output voltage of the intake manifold pressure sensor 7 from the last interrupt processing until the current interrupt processing, by calculating a peak hold value of the output voltage, while sampling it at each predetermined period of time (e.g., 1.25 ms).

Subsequently, coefficients A and B, which are used in the expression (18) for calculating the cylinder internal pressure Pin at the time of the end of the intake stroke, are calculated (step 502).

As mentioned above, the expression (18) is represented by the use of the phase angle of the intake VVT 10 in connection with the intake valve and an open period of time of the intake valve, without regard to an overlap amount in connection with the exhaust valve and the phase angle of the exhaust VVT 11, and so, the coefficients A and B should just be calculated by the use of a map in which the intake VVT phase angle and the engine rotational speed are used as axes. Accordingly, in step 502, the coefficients A and B are calculated by using the map with the intake VVT phase angle and the engine rotational speed being taken as axes.

Thereafter, by using the intake manifold pressure peak value Pbp and the coefficients A and B, which have already been calculated, the cylinder internal pressure Pin at the time of the end of the intake stroke is calculated as shown in the expression (18) (step 503), and the exhaust temperature Tex is also calculated (step 504).

As mentioned above, with respect to the exhaust temperature Tex, it may be set by a map based on measured values, or it may be calculated from an index such as a thermal efficiency, which is separately calculated for engine control, or still more simply, it may also be set as a fixed value (e.g., about 800 degrees C.).

Here, the exhaust temperature Tex is to be calculated by using a map of the engine rotational speed and the charging efficiency. Here, note that in order to simulate a response delay of the exhaust temperature at the time of transient operation, filtering processing may be carried out with respect to the exhaust temperature Tex which has been calculated by the use of the map.

Then, the intake manifold pressure Pb(n), the intake manifold temperature Tb(n) and the volumetric efficiency correction factor Kv(n), which have been calculated by the volumetric efficiency correction factor calculation unit 22 shown in FIG. 4, are obtained (step 505).

Here, note that with respect to the volumetric efficiency correction factor Kv(n), the filtered volumetric efficiency correction factor Kvf(n) is to be obtained as the volumetric efficiency correction factor Kv(n).

Subsequently, the intake efficiency Kin is calculated by the use of the above-mentioned expression (21) (step 506).

Finally, the internal EGR rate Regr is calculated by the use of the expression (16) (step 507), and the processing routine of FIG. 8 is then ended.

As described above, the estimation device for a cylinder intake air amount in an internal combustion engine according to the first embodiment of the present invention is provided with: the AFS 2 (intake air amount detection unit) that detects the amount of intake air Qa which passes through the throttle valve 4a arranged in the intake pipe of the engine 1 (internal combustion engine) and is sucked into the internal combustion engine in order to estimate the cylinder intake air amount to the engine 1 connected to the intake pipe at the downstream of the throttle valve 4a; and the physical model 25 that models a response delay of the intake system until the air having passed through the throttle valve 4a comes into a cylinder.

The physical model 25 is provided with: the volumetric efficiency correction factor calculation unit 22 (volumetric efficiency corresponding value calculation unit) that calculates the volumetric efficiency correction factor Kv (the volumetric efficiency corresponding value) which is an index indicating an amount of air coming into a cylinder of the internal combustion engine from a downstream side of the throttle valve 4a; the cylinder intake air amount calculation unit 21 that calculates the cylinder intake air amount Qc actually sucked into the cylinder by using the amount of intake air Qa, the volumetric efficiency corresponding value and the physical model 25; and the intake manifold density calculation unit 23 (intake pipe internal density calculation unit) that calculates the intake manifold density ρ b (the density of fresh air in the intake pipe) at the downstream of the throttle valve 4a, and the amount of change Δ ρ b (=ρ b(n)−ρ b (n−1)) of the intake manifold density (the amount of change of fresh air in the intake pipe).

The volumetric efficiency correction factor calculation unit 22 calculates the volumetric efficiency correction factor Kv by using the amount of intake air Qa, the intake manifold density ρ b, and the amount of change Δ ρ b of the intake manifold density.

In this manner, by calculating in real time the volumetric efficiency correction factor Kv used in the physical model 25 based on sensor information detected in real time, it is possible to estimate the cylinder intake air amount Qc to a sufficient degree of accuracy for controlling the engine 1 in a suitable manner, with a small number of adaptation constants and a small amount of calculation load, without requiring a huge memory capacity.

That is, the cylinder intake air amount Qc can be calculated with a high degree of accuracy by the use of the physical model 25.

In addition, the estimation device for a cylinder intake air amount in an internal combustion engine according to the first embodiment of the present invention is provided with the intake manifold pressure sensor 7 (a pressure detection unit) that the intake air temperature sensor 8 (a temperature detection unit) which are arranged in the intake pipe at the downstream side of the throttle valve 4a, wherein the intake manifold density calculation unit 23 calculates the intake manifold density ρ b and the amount of change Δ ρ b of the intake manifold density by using the intake manifold pressure Pb (the intake pipe internal pressure) and the intake manifold temperature Tb (the intake pipe internal temperature) which are detected by the pressure detection unit and the temperature detection unit, respectively.

As a result of this, it is possible to calculate the intake manifold density ρ b and the amount of change Δ ρ b of the intake manifold density in an easy manner.

Moreover, the volumetric efficiency correction factor calculation unit 22 calculates the volumetric efficiency correction factor Kv(n) from the following expression (22) using the amount of intake air Qa [g] for one stroke of the internal combustion engine, the intake manifold density ρ b [g/cm$^3$] (intake pipe internal density), the amount of change Δ ρ b [g/cm$^3$] of air in the intake pipe, the intake pipe volume Vs [cm$^3$] from the downstream side of the throttle valve 4a to a cylinder inlet port of the internal combustion engine, and the cylinder stroke volume Vc [cm$^3$] per one cylinder of the internal combustion engine.

[Expression 22]

$$Kv = \frac{Qa - \Delta \rho_b \cdot Vs}{\rho_b \cdot Vc} \quad (22)$$

According to this, the volumetric efficiency correction factor Kv can be estimated with a high degree of accuracy by a simple calculation operation based on a theoretical consideration.

Further, the volumetric efficiency correction factor calculation unit 22 calculates, as a final volumetric efficiency correction factor, the filtered volumetric efficiency correction factor Kvf(n) which is obtained by further carrying out filtering processing with respect to the volumetric efficiency correction factor Kv calculated from the expression (22).

As a result of this, it is possible to suppress the influence on the volumetric efficiency correction factor Kv due to a minute detection error included in the sensor, thus making it possible to estimate the cylinder intake air amount Qc with a further high degree of accuracy.

In addition, the physical model 25 according to the first embodiment of the present invention is provided with the internal EGR rate calculation unit 24 that calculates the internal EGR rate Regr which is an index indicating an amount of exhaust gas after combustion which has remained in the cylinder without being discharged from the interior of the cylinder to the exhaust pipe.

The internal EGR rate calculation unit 24 calculates the internal EGR rate Regr by using the intake efficiency Kin, which is the ratio of the intake manifold density ρ b and the cylinder internal density of the internal combustion engine, and the volumetric efficiency correction factor Kv.

According to this, it is possible to calculate the internal EGR rate Regr in real time with a high degree of accuracy.

Accordingly, not only the cylinder intake air amount Qc but also the internal EGR rate Regr can be estimated to a sufficient degree of accuracy for controlling the engine in a suitable manner, with a small number of adaptation constants and a small amount of computation or calculation load.

Moreover, the internal EGR rate calculation unit 24 calculates the internal EGR rate Regr from the expression (16) using the volumetric efficiency correction factor Kv, the intake efficiency Kin, and the compression ratio E of the internal combustion engine, so that the internal EGR rate Regr can be estimated with a high degree of accuracy by a simple calculation operation based on a theoretical consideration.

Further, the internal EGR rate calculation unit 24 calculates the intake efficiency Kin from the expression (21) using the cylinder internal pressure Pin [kPa], the intake manifold pressure Pb [kPa] (the intake pipe internal pressure), the exhaust temperature Tex [° K] (the exhaust pipe internal temperature), and the intake manifold temperature Tb [° K] (the intake pipe internal temperature), at the time of the end of the intake stroke of the internal combustion engine, so that the intake efficiency Kin can be calculated based on a theoretical consideration with a high degree of accuracy.

In addition, because the internal EGR rate calculation unit 24 approximates the cylinder internal pressure Pin [kPa] used for the expression (21) as a quadratic function of the intake manifold pressure Pb [kPa], it is possible to estimate the cylinder internal pressure Pin at the time of the end of the intake stroke to a sufficient degree of accuracy for controlling the engine 1 in a suitable manner, with a small number of adaptation constants and a small amount of calculation load.

Further, the internal EGR rate calculation unit 24 uses the intake manifold pressure peak value Pbp (a maximum value of the intake pipe internal pressure) between predetermined crank angles as the intake manifold pressure Pb [kPa] for approximating the cylinder internal pressure Pin [kPa], so that the cylinder internal pressure Pin at the time of the end of the intake stroke can be estimated with a high degree of accuracy.

What is claimed is:
1. An estimation device for a cylinder intake air amount in an internal combustion engine, which serves for estimating an amount of intake air sucked into a cylinder in the internal combustion engine which is connected to an intake pipe at a location downstream of a throttle valve, said estimation device comprising:

an intake air amount detection unit that detects an amount of intake air which passes through said throttle valve and is sucked into said internal combustion engine; and a physical model that models a response delay of an intake system until air having passed through said throttle valve comes into said cylinder;

wherein said physical model comprises:

a volumetric efficiency corresponding value calculation unit that calculates a volumetric efficiency corresponding value which is an index indicating an amount of air coming into the cylinder of said internal combustion engine from a downstream side of said throttle valve;

a cylinder intake air amount calculation unit that calculates the cylinder intake air amount actually sucked into said cylinder by using said amount of intake air, said volumetric efficiency corresponding value and said physical model; and an intake pipe internal density calculation unit that calculates an intake pipe internal density at the downstream side of said throttle valve, and an amount of change of the intake pipe internal density;

wherein said volumetric efficiency corresponding value calculation unit calculates said volumetric efficiency corresponding value by using said amount of intake air, said intake pipe internal density, and said amount of change of the intake pipe internal density.

2. The estimation device for a cylinder intake air amount in an internal combustion engine, as set forth in claim 1, further comprising:

a pressure detection unit and a temperature detection unit that are arranged in the intake pipe at the downstream side of said throttle valve;

wherein said intake pipe internal density calculation unit calculates said intake pipe internal density and said amount of change of the intake pipe internal density by using an intake pipe internal pressure and an intake pipe internal temperature which are detected by said pressure detection unit and said temperature detection unit, respectively.

3. The estimation device for a cylinder intake air amount in an internal combustion engine, as set forth in claim 1, wherein said volumetric efficiency corresponding value calculation unit calculates said volumetric efficiency corresponding value Kv from the following expression (1)

[Expression 1]

$$Kv = \frac{Qa - \Delta\rho_b \cdot Vs}{\rho_b \cdot Vc} \qquad (1)$$

using the amount of intake air Qa [g] for one stroke of said internal combustion engine, said intake pipe internal density ρb [g/cm³], said amount of change Δρb [g/cm³] of air in the intake pipe, an intake pipe volume Vs [cm³] from a downstream side of said throttle valve to a cylinder inlet port of said internal combustion engine, and a cylinder stroke volume Vc [cm³] per one cylinder of said internal combustion engine.

4. The estimation device for a cylinder intake air amount in an internal combustion engine, as set forth in claim 3, wherein said volumetric efficiency corresponding value calculation unit calculates, as a final volumetric efficiency corresponding value, a filtered volumetric efficiency corresponding value which is obtained by further carrying out filtering processing with respect to the volumetric efficiency corresponding value calculated from said expression (1).

5. The estimation device for a cylinder intake air amount in an internal combustion engine, as set forth in claim 1, further comprising:

an internal EGR rate calculation unit that calculates an internal EGR rate which is an index indicating an amount of exhaust gas after combustion which has remained in said cylinder without being discharged from the interior of said cylinder to an exhaust pipe;

wherein said internal EGR rate calculation unit calculates said internal EGR rate by using an intake efficiency, which is a ratio of said intake pipe internal density and a cylinder internal density of said internal combustion engine, and said volumetric efficiency corresponding value.

6. The estimation device for a cylinder intake air amount in an internal combustion engine, as set forth in claim 5, wherein said internal EGR rate calculation unit calculates said internal EGR rate Regr from the following expression (2)

[Expression 2]

$$R_{egr} = 1 - \frac{Kv}{K_{in} \cdot \dfrac{\varepsilon}{\varepsilon - 1}} \qquad (2)$$

using said volumetric efficiency corresponding value Kv, said intake efficiency Kin, and a compression ratio E of said internal combustion engine.

7. The estimation device for a cylinder intake air amount in an internal combustion engine, as set forth in claim 6, wherein said internal EGR rate calculation unit calculates said intake efficiency Kin from the following expression (3)

[Expression 3]

$$K_{in} = \frac{\dfrac{P_{in}}{P_b} \cdot T_b + \dfrac{Kv}{\varepsilon/(\varepsilon - 1)} \cdot (T_{ex} - T_b)}{T_{ex}} \qquad (3)$$

using a cylinder internal pressure Pin [kPa] at the time of the end of the intake stroke of said internal combustion engine, an intake pipe internal pressure Pb [kPa], an exhaust pipe internal temperature Tex [° K], and an intake pipe internal temperature Tb [° K].

8. The estimation device for a cylinder intake air amount in an internal combustion engine, as set forth in claim 7, wherein said internal EGR rate calculation unit approximates said cylinder internal pressure Pin [kPa] used for said expression (3) as a quadratic function of said intake pipe internal pressure Pb [kPa].

9. The estimation device for a cylinder intake air amount in an internal combustion engine, as set forth in claim 8, wherein said internal EGR rate calculation unit uses a maximum value of the intake pipe internal pressure between predetermined crank angles as said intake pipe internal pressure Pb [kPa] for approximating said cylinder internal pressure Pin [kPa].

* * * * *